United States Patent [19]

Uuskallio

[11] Patent Number: 4,909,218

[45] Date of Patent: Mar. 20, 1990

[54] ENGINE SPEED CONTROL CABLE CLAMP ASSEMBLY

[75] Inventor: Arvo F. Uuskallio, Hartland, Wis.

[73] Assignee: Briggs & Stratton Corporation, Wauwatosa, Wis.

[21] Appl. No.: 292,254

[22] Filed: Dec. 30, 1988

[51] Int. Cl.[4] .............................. F16C 1/06; F16C 1/10
[52] U.S. Cl. ..................................... 123/400; 123/403; 74/502.6; 248/74.4; 24/573
[58] Field of Search ........................ 123/376, 400, 403; 74/502, 502.4, 502.5, 502.6; 248/67.5, 74.1, 74.4, 316.6; 24/135 N, 458, 532, 573

[56] References Cited

U.S. PATENT DOCUMENTS

| 1,129,782 | 2/1915 | Bissell et al. | 248/74.4 X |
| 3,150,539 | 9/1964 | Wallis, Jr. | 248/74.1 X |
| 3,253,480 | 5/1966 | Fernberg | 74/502.6 X |
| 3,843,083 | 10/1974 | Angibaud | 248/74.4 X |
| 3,945,267 | 3/1976 | Stimpson | 74/502.6 |
| 4,170,995 | 10/1979 | Levine et al. | 248/74.1 X |
| 4,455,716 | 6/1984 | Leonardo | 248/74.1 X |
| 4,524,741 | 6/1985 | Corbi | 123/400 X |
| 4,601,451 | 7/1986 | Leonardo | 248/74.1 |
| 4,823,752 | 4/1989 | Uuskallio | 123/400 |

Primary Examiner—Willis R. Wolfe
Attorney, Agent, or Firm—Andrus, Sceales, Starke & Sawall

[57] ABSTRACT

A clamp assembly for fixedly mounting the lower end of a remote speed control cable that controls the speed of a small internal combustion engine. The clamp assembly includes a casing clamp having a mounting member having a base plate with a first fastener receiving opening formed therethrough and a mounting plate spaced from one side of the base plate and interconnected therewith by a link member, and a clamp plate spaced from the other side of the base plate including a body portion having a second fastener receiving opening formed therethrough disposed in alignment with the first fastener-receiving opening. The clamp plate is movable toward the base plate by a fastener to permit clamping of a cable casing between the clamp plate and the base plate. The mounting plate includes a dimple projecting therefrom for engaging and stopping the fastener at a predetermined location as well as a pair of shoulders for properly locating the casing clamp on an engine mounting bracket. The base plate includes a pair of ears projecting from its opposite side edges to prevent rotation of the casing clamp on the engine mounting bracket.

20 Claims, 2 Drawing Sheets

ENGINE SPEED CONTROL CABLE CLAMP ASSEMBLY

BACKGROUND OF THE INVENTION

The present invention relates to internal combustion engines, and more particularly to a clamp assembly for fixedly mounting on the engine a remote control cable that controls the speed of the engine.

The speed of small internal combustion engines employed with lawn and garden equipment, such as lawn mowers, is typically controlled by a remote speed control cable having it upper end connected to a remote speed control lever movable by an operator and its lower end connected to an engine speed control lever on the engine. Such a remote speed control cable generally employs a control wire slidably contained in a surrounding casing. The casing may be metal, plastic and/or combinations thereof depending upon the particular application.

In the past, the lower end of the speed control cable was attached to the engine by first inserting the control wire into a hole in the end of the engine speed control lever and then mounting the end of the cable casing to the engine with a casing clamp. Typically, this casing clamp was a metal C-shaped member having an opening formed through its web portion for receiving a screw that was threaded into a tapped bore on an engine component. Thus, as the screw was tightened, the casing clamp could merely sandwich the speed control cable between the web portion of the C-shaped clamp and the engine component. Such clamps were oftentimes overtightened during assembly, which crushed the cable jacket or casing, thus preventing sliding of the cable wire within the jacket.

Another type of casing clamp utilized a metal block having a semi-circular shaped cable receiving slot formed along it inner surface. This clamp also utilized a screw extending through the metal block to attach the cable to a plastic component such as a fuel tank by sandwiching the cable against the side of the fuel tank. Typically, this casing clamp was utilized with plastic cable jackets or casings to prevent crushing of the casing or jacket. However, since the cable casing is plastic and the fuel tank is plastic, this type of clamp necessitated the use of a metal plate positioned between the cable and fuel tank, resulting in a three-part clamp, namely, the metal block, the metal plate and the screw. Such clamps involved assembly problems due to the need to quickly and properly position the three components of the clamp during assembly.

SUMMARY OF THE INVENTION

A clamp assembly for fixedly mounting on an internal combustion engine the casing of one end of a remote speed control cable that controls the speed of the engine.

The clamp assembly comprises a casing clamp including a mounting member that includes a flat base plate having a first fastener-receiving opening formed therethrough and a mounting plate spaced from one side of the base plate and interconnected therewith, and a clamp place spaced from the other side of the base plate including a flat body portion having a second fastener-receiving opening formed therethrough disposed in alignment with said first fastener-receiving opening, said clamp plate movable toward said base plate by a fastener to permit clamping of a cable between said clamp plate and said base plate. Engine mounting means on the engine receives the mounting plate to removably mount the casing clamp thereon.

The base plate includes a lower edge which includes a notch therein disposed in alignment with a notch formed in a lower portion of the engine mounting means. These notches cooperate with a tongue projecting from the clamp plate to provide a locating means for the clamp plate to properly align the clamp plate and base plate as well as to prevent rotation of the clamp plate.

In a preferred form, a link member extends between the upper edges of the base plate and the mounting plate, and the mounting plate is dimensioned to have a width less than the width of the base plate. Additionally, the base plate may include a locating means in the form of a pair of ears extending along opposite side edges of the base plate and projecting toward said mounting plate for positioning the mounting member at a predetermined location on an engine, and for preventing rotation of the mounting member on its engine mount. The mounting plate also includes stop means for engaging and stopping a fastener extending through said fastener-receiving openings at a predetermined location. Preferably the stop means comprises a dimple located in alignment with said faster-receiving openings and projecting from said mounting plate toward said base plate.

The present invention thus provides a low cost clamp that positively holds the cable casing which is faster and easier to assemble than prior casing clamps. The clamp may be used on plastic, metal or combination plastic/metal cable casings, will accept a variety or range of cable casing outer diameters, and avoids crushing or cutting through the cable casing. Additionally, the present clamp provides fewer components for assembly while advantageously maintaining the requirements for installation adjustability, easy serviceability and economical replacement.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
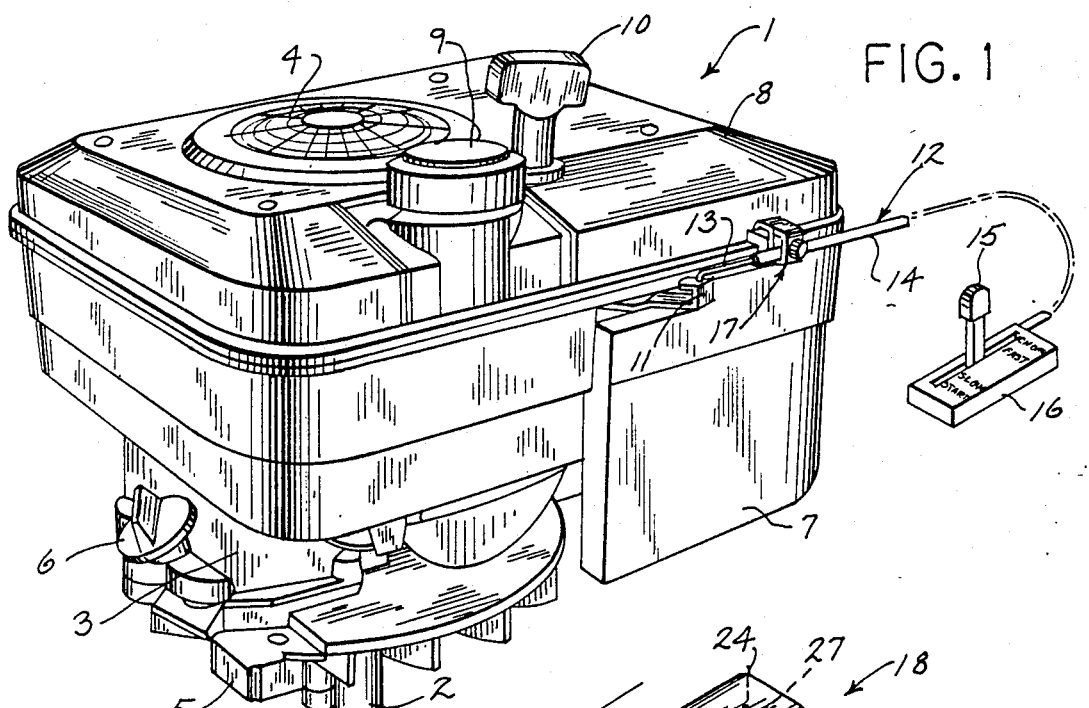
FIG. 1 is a perspective view of an internal combustion engine incorporating an engine speed control cable casing clamp assembly constructed in accordance with the principles of the present invention.

Referring now to the drawings, FIG. 1 illustrates a small internal combustion engine, generally designated by the numeral 1, for use in connection with lawn and garden equipment, such as lawn mowers. Engine 1 is of the vertical shaft type and includes a crankshaft 2 connected to a piston (not shown) within cylinder 3, and a rotating air filtering screen 4. Oil for cylinder 3 is contained within oil sump 5 which may be filled via removal of an oil fill cap 6. Engine 1 also includes an air cleaner 7, a fuel tank 8 that may be filled via a fuel fill cap 9, and an optional handle 10 connected to a vertical pull starter rope (not shown). Fuel tank 8 is composed of a plastic material which reduces the overall weight of engine 1. Engine 1 also includes an engine speed control lever 11 which is pivotally mounted on engine 1 having one end projecting from engine 1 between air cleaner 7 and fuel tank 8, and its other end operatively connected to the carburetor of engine 1 for controlling the speed of engine 1.

A remote speed control cable 12 is typically used with lawn and garden equipment such as lawn mowers to control the speed of engine 1 by pivoting or moving engine speed control lever 11. Cable 12 defines a longitudinal axis and includes a metal control wire 13 slidably mounted within a surrounding plastic casing or jacket 14. As shown best in FIG. 1, one end or upper end of control wire 13 is connected to a remote speed control lever 15 which is pivotally mounted within a speed control box 16. Speed control box 16 is typically mounted on the handle assembly of a lawn mower for manual movement of lever 15 by an operator. The other end or lower end of control wire 13 is connected to the projecting end of speed control lever 11. Cable casing 14, in turn, has its upper end connected to control box 16 and its lower end fixedly mounted on engine 1 by a casing clamp 17. Thus, movement of control wire 14 by an operator pivoting remote speed control lever 15 results in movement of engine speed control lever 11 which, in turn, controls the speed of engine 1.

Figure 2:
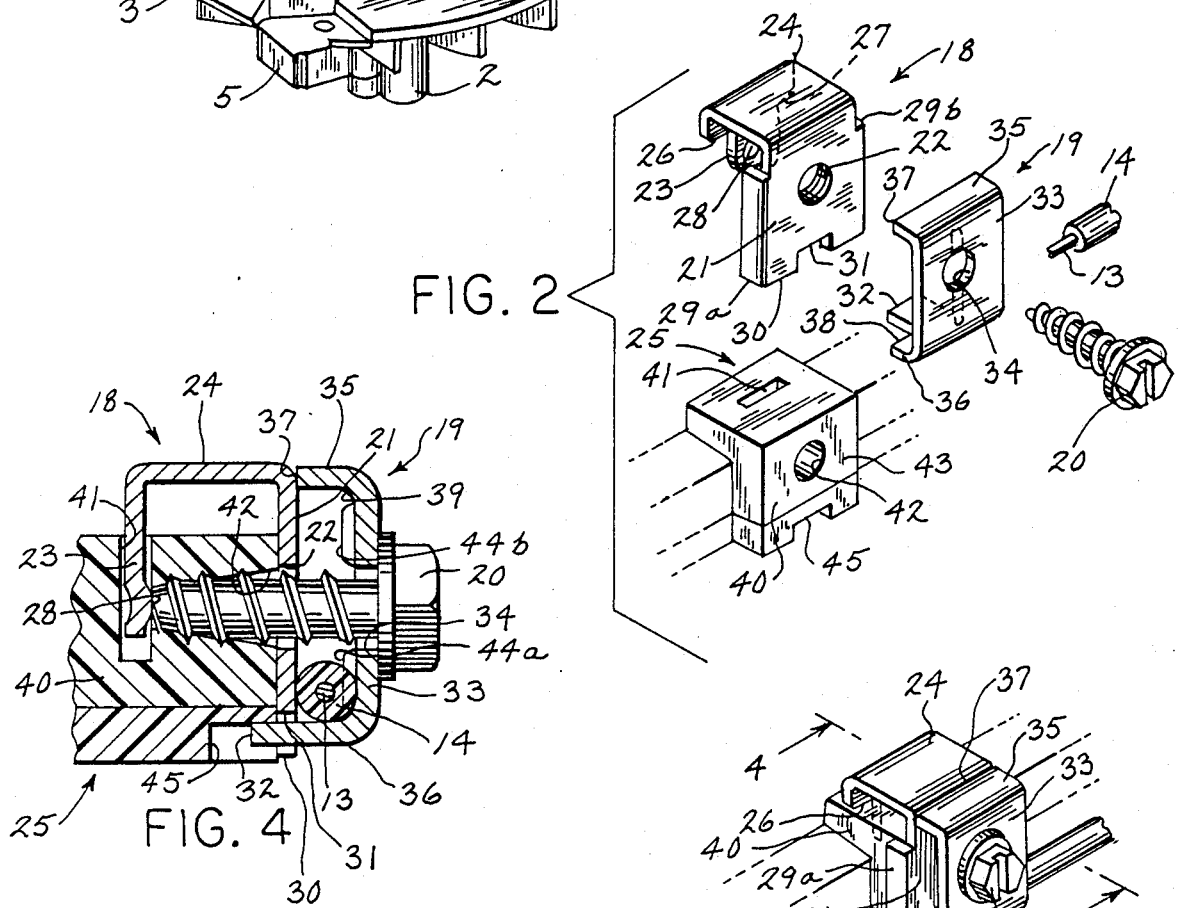
FIG. 2 is an exploded perspective view illustrating the components of the casing clamp assembly of FIG. 1.
Figure 4:
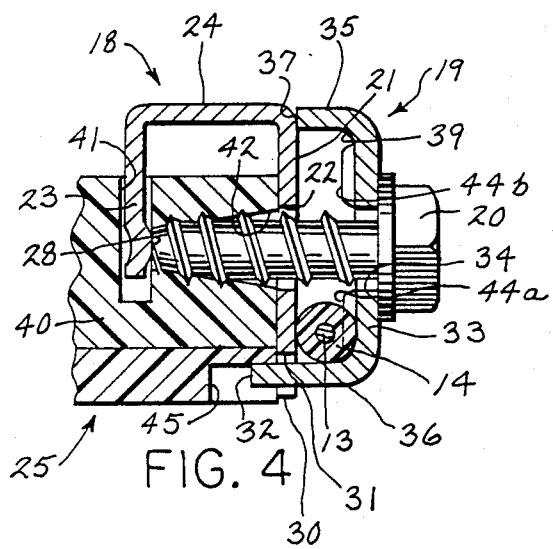
FIG. 4 is an enlarged cross sectional view taken along the plane of the line 4—4 of FIG. 3.
Figure 3:
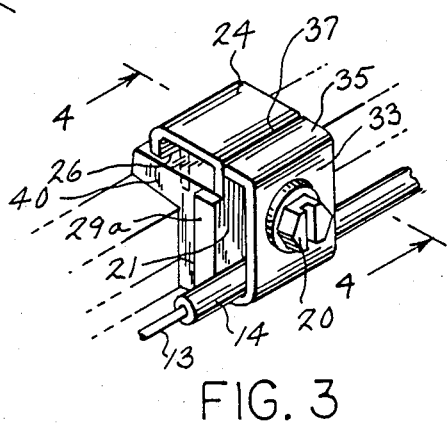
FIG. 3 is a perspective view illustrating the components of the casing clamp assembly in their assembled condition and after clamping.

Turning now to FIGS. 2-4, there is illustrated in more detail the components of casing clamp 17. Casing clamp 17 includes a mounting member 18 and a clamp plate 19 removably attachable to mounting member 18 by a fastener or screw 20. Mounting member 18 includes a flat base plate 21 having a first fastener-receiving opening 22 formed therethrough, and a mounting plate 23 spaced from one side of base plate 21 and integrally interconnected therewith along the upper edges of plates 21 and 23 by a link member 24. As shown best in FIG. 4, mounting plate 23 is disposed parallel to base plate 21, and, as shown best in FIG. 2, each of the upper edges of plates 21 and 23 define a width for its respective plate 21 or 23 and mounting plate 23 is dimensioned to have a width less than the width of base plate 21. Mounting plate 23 is thus easily received and mounted by a mounting bracket 25 integrally formed on the side of plastic fuel tank 8 on engine 1, as will hereinafter be described. Due to the reduced width of mounting plate 23, a pair of shoulders 26, 27 are formed on opposite sides of the upper edge thereof, Shoulders 26, 27 prevent rotational movement of clamp 17 with respect to mounting bracket 25 by engaging the upper surface of bracket 25 when mounting plate 23 is inserted therein, as will hereinafter be described. The lower portion of mounting plate 23 includes a sop means for engaging and stopping screw 20 at a predetermined location to prevent screw 20 from puncturing or cracking fuel tank 8 and possibly causing a gasoline leak. As shown best in FIGS. 2 and 4, this stop means comprises a dimple 28 located in alignment with fastener-receiving opening 22 and projecting from the lower end of mounting plate 23 toward base plate 21.

As also shown best in FIG. 4, base plate 21 includes a locating means for positioning plate 21 at a predetermined location on mounting bracket 25 on engine 1. As shown, this locating means comprises a pair of ears 29a and 29b extending along opposite side edges of base plate 21 and projecting toward mounting plate 23. Ears 29a and 29b engage the side surfaces of bracket 25 to not only position mounting member 19 properly with respect to bracket 25, but also to prevent rotation of member 19. Additionally, base plate 21 includes a lower edge 30 at its lower end that includes a notch or groove 31 which cooperates with a notch or groove 45 in bracket 25 and a tongue 32 projecting from clamp plate 19 to provide a locating means for positioning clamp plate 19 at a predetermined location on mounting member 18 for proper alignment of clamp plate 19 on mounting member 18. Notches 31 and 45 also cooperate wit tongue 32 to prevent rotation of clamp plate 19 relative to mounting member 18.

Clamp plate 19 is generally C-shaped and includes a flat body portion 33 spaced from base plate 21 and disposed generally parallel thereto. Body portion 33 includes a second fastener-receiving opening 34 formed therethrough disposed in alignment with the first fastener-receiving opening 22 formed in base plate 21. Clamp plate 19 also includes an upper leg 35 and a lower leg 36 projecting substantially transverse of body portion 33 toward base plate 21. Upper leg 35 includes an abutment surface 37 and lower leg 36 includes an abutment surface 38 which engage the outer surface of base plate 21 so as to define a cable receiving opening 39 formed between base plate 21 and body portion 33 of clamp plate 19. As shown best in FIGS. 3 and 4 cable 12 is preferably located within opening 39 between the lower portions of base plate 21 and body portion 33 of clamp plate 19. However, cable 12 could if desired be located between the upper portions of plates 21 and 19 above screw 20. Tongue 32 projects from lower leg 36 and is received within groove 31 in base plate 21 and notch 45 in bracket 25 to not only properly locate fastener-receiving openings 22 and 34 in alignment with one another, but also to prevent rotational movement of clamp plate 19 with respect to mounting member 18 and bracket 25. Abutment surfaces 37, 38 also aid in preventing excessive "rocking" movement of clamp plate 19 during assembly.

The lower end and upper end of body portion 33 of clamp plate 19 includes an inner cable engaging surface having projections 44a and 44b, respectively, projecting therefrom. Projections 44a and 44b are disposed longitudinally in a direction transverse with respect to fastener-receiving opening 34 as well as the longitudinal axis of cable 12, and project from the flat inner cable engaging surface of clamp plate 19 a distance that is less than ½ the diameter of cable casing 14, and preferably about 1/10th the diameter of casing 14. As illustrated, the height of projections 44a and 44b is about 0.010 inches to about 0.020 inches from the surface of body portion 33. The above dimensions insure that projections 44a and 44b "bite" into and tightly engage casing 14 of cable 12, but do not cut into casing 14. Typically, the outer diameter of cable 12 varies from a minimum of about 0.185 inches to a maximum of about 0.230 inches.

Mounting bracket 25 provides an engine mounting means on engine 1 for receiving mounting plate 23 and removably mounting casing clamp 17 thereon. Mounting bracket 25 includes a rectangular shaped boss 40 projecting from a side of fuel tank 8. Boss 40 may be integrally molded with fuel tank 8 and includes a slot 41 formed therein which extends downwardly from its upper surface to communicate with a blind bore or third fastener-receiving opening 42 formed in boss 40. Opening 42 extends transversely of slot 41 and opens to the front face 43 of boss 40. As shown best in FIG. 4, opening or bore 42 is tapered and dimensioned to have a diameter less than screw 20. It should also be noted that slot 41 may be dimensioned so as to permit a press fit arrangement with mounting plate 23. Alternately, slot 41 may be dimensioned to permit an adhesive attachment between mounting plate 23 and boss 40, or may be dimensioned so that should mounting plate 23 be heated the plastic material of boss 40 will melt upon insertion of mounting plate 23 and slot 41 to provide a substantially permanent connection therewith.

As shown in FIGS. 2 and 4, screw 20 is typically a sheet metal screw, but any suitable fastener may be used depending upon the particular application. Preferably, however, a sheet metal screw is utilized for its thread forming ability to cut threads into the inner diameter of bore 42 during assembly. This prevents screw 20 from "backing out" during operation.

In order to fixedly mount casing 14 of cable 12 on engine 1, control wire 13 is first inserted into a hole in the projecting end of engine speed control lever 11, with engine speed control lever 11 and remote speed control lever 15 adjustably positioned for proper operation. Control cable 12 is then positioned within cable receiving opening 39 between base plate 21 and portion 33 of clamp plate 19. Screw 20 is then inserted through opening 34 into opening 22. Thereafter, a screw driver or a pneumatically or hydraulically operated power tool may be utilized to turn down screw 20 through opening 22 into opening 42 until the lower end of its shank engages dimple 28. As this occurs, the threads on screw 20 cut into the inner diametrical surface of hole 22 to form threads therein. Initially, as this occurs, clamp plate 19 is drawn towards base plate 21 so that projection 44 "bites" into casing 14, but does not crush or cut casing 14.

In order to remove cable 12 from clamp 17, screw 20 is turned out (but not removed) sufficiently to permit tongue 32 to clear groove 11 to permit removal of cable 12 via the opening between the lower portions of base plate 21 and clamp plate 19 by applying a light downward manual force to cable 12. Cable 12 may also be reinserted into clamp 17 with a light upward manual force without removing screw 20. Alternately, screw 20 may be completely removed from plate 21 and opening 34, if desired.

Figure 5:
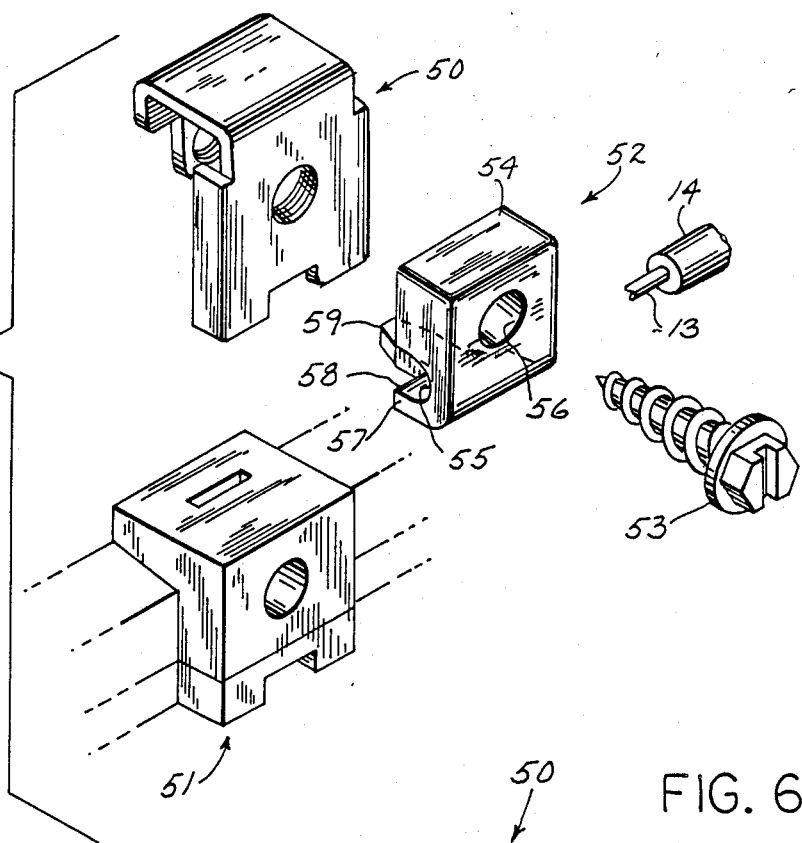
FIG. 5 is an exploded perspective view illustrating the components of a second embodiment of the casing clamp of the present invention.
Figure 6:
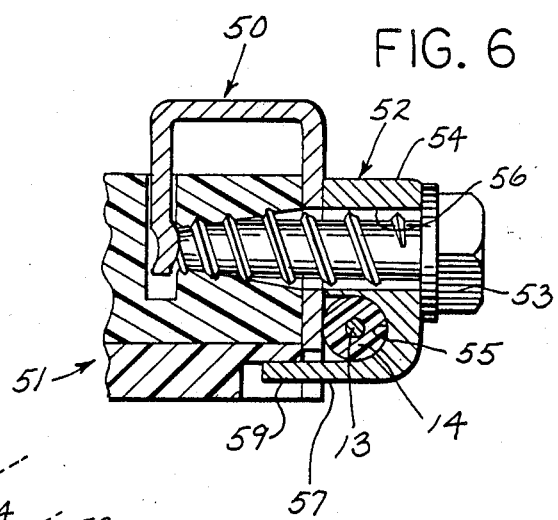
FIG. 6 is a cross sectional view taken along the plane of the line 6—6 of FIG. 7.
Figure 7:
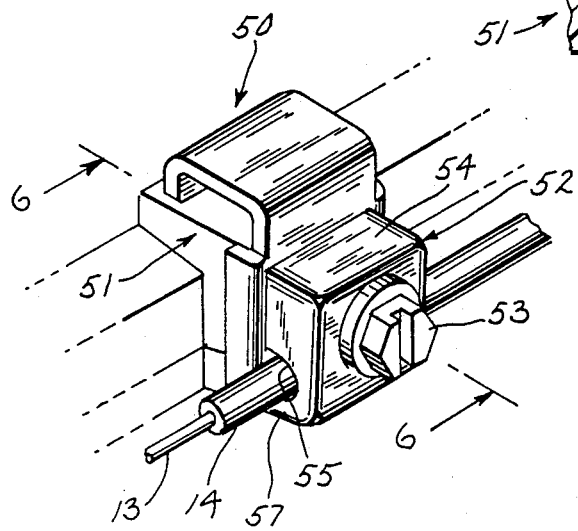
FIG. 7 is a perspective view illustrating the components of the casing clamp of FIG. 5 in their assembled condition and after clamping.

Referring now to FIGS. 5-7, there is illustrated a second embodiment of the casing clamp 17 of the present invention. In this embodiment, casing clamp 17 includes a mounting member 50, an engine bracket 51, and a clamp plate 52 removably attachable to member 50 by a fastener 53. Mounting member 50, engine bracket 51 and fastener 53 are identical to member 18, bracket 25, and fastener 20 of the first embodiment illustrated and described herein. Clamp plate 52 on the other hand includes a body 54 having a solid upper portion and a semi-circular shaped cable receiving slot 55 formed in its lower portion. The upper portion of body 54 includes a fastener-receiving opening 56 formed therethrough transversely of the longitudinal dimension of slot 55, and disposed in alignment with the fastener receiving opening in the base plate of mounting member 50. Body 54 also includes a lower leg 57 having an abutment surface 58 for engagement with the outer surface of the base plate of mounting member 50, and a tongue 59 projecting from leg 57. Surface 58 and tongue 59 operate in the same manner as their corresponding elements did in the first embodiment to provide locating, anti-rotation and anti-rocking functions.

Operation of this second embodiment of casing clamp 17 is substantially similar to that previously described herein with respect to the first embodiment of FIGS. 2–4.

A casing clamp assembly has been illustrated and described which provides a simple and reliable method of mounting the casing of the lower end of a remote speed control cable to an engine. Various modifications and/or substitutions may be made to the specific components described herein without departing from the scope of the invention. For example, different materials of construction may be utilized than those specifically described and illustrated herein depending upon the particular application and control cable utilized.

Various modes of carrying out the invention are contemplated as being within the scope of the following claims particularly pointing out and distinctly claiming the subject matter which is regarded as the invention.

I claim:

1. In an internal combustion engine including an engine speed control lever on the engine and a remote speed control cable for moving said engine speed control lever to control the speed of the engine, said remote speed control cable defining a longitudinal axis and having a control wire connected at one end to a remote speed control lever and at its other end to said engine speed control lever and a casing surrounding said control wire slidably receiving said wire therein, a casing clamp assembly for fixedly mounting said casing on the engine to permit sliding movement of said control wire relative to said casing, said casing clamp assembly comprising:

a casing clamp including a mounting member having a flat base plate with a first fastener-receiving opening formed therethrough and a mounting plate spaced from one side of said base plate and interconnected therewith, and a clamp plate spaced from the other side at said base plate to form a cable-receiving opening therebetween and including a body portion having a second fastener-receiving opening formed therethrough disposed in alignment with said first fastener-receiving opening, said clamp plate movable toward said base plate by a fastener to permit clamping of a cable in said cable-receiving opening between said clamp plate and said base plate;

a fastener insertable through said first and second openings; and engine mounting means on the engine for receiving said mounting plate and removably mounting said casing clamp thereon.

2. The clamp assembly of claim 1 wherein said base plate and mounting plate are disposed parallel to one another and said mounting plate includes an edge disposed opposite an edge of said base plate and a link member extends therebetween.

3. The clamp assembly of claim 2 wherein said edges comprise upper edges of said plates.

4. The clamp assembly of claim 1 wherein said engine mounting means includes a third fastener-receiving opening formed therein disposed in alignment with said first and second fastener-receiving openings.

5. The clamp assembly of claim 4 wherein said mounting plate includes a stop means thereon to engage and stop said fastener at a predetermined location.

6. The clamp assembly of claim 5 wherein said stop means comprises a dimple located in alignment with said fastener-receiving openings and projecting from said mounting plate toward said base plate.

7. The clamp assembly of claim 4 further including mounting member locating means for positioning said mounting member at a predetermined location on said engine mounting means for proper alignment of said first fastener-receiving opening with said third fastener-receiving opening.

8. The clamp assembly of claim 7 wherein said mounting member locating means comprises at least one shoulder formed in said mounting plate engageable with said engine mounting means.

9. The clamp assembly of claim 1 further including means for preventing rotational movement of said casing clamp with respect to said engine mounting means.

10. The clamp assembly of claim 9 wherein said rotation prevention means comprises a pair of ears projecting from opposite side edges of said base plate toward said mounting plate.

11. The clamp assembly of claim 1 further including clamp plate locating means for positioning said clamp plate at a predetermined location on said mounting member for proper alignment of said first fastener-receiving opening with said second fastener-receiving opening.

12. The clamp assembly of claim 11 wherein said clamp plate locating means comprises a groove in said base plate and a projecting tongue on said clamp plate.

13. A mounting member for a clamp for a remote engine speed control cable having a casing surrounding a control wire slidably received therein for fixedly mounting the casing to permit sliding movement of the control wire relative to the casing, comprising:
 a flat base plate having a fastener-receiving opening formed therethrough;
 a mounting plate spaced from one side of said base plate and interconnected therewith including a flat body portion disposed parallel to said base plate; and
 stop means on said mounting plate for engaging and stopping a fastener extending through said fastener-receiving opening at a predetermined location.

14. The mounting member of claim 13 wherein said mounting plate includes an edge disposed opposite an edge of said base plate and a link member extends therebetween.

15. The mounting member of claim 14 wherein said edges comprise upper edges of said plates.

16. The mounting member of claim 15 wherein each of said upper edges define a width for its respective plate and said mounting plate is dimensioned to have a width less than the width of said base plate.

17. The mounting member of claim 13 wherein said stop means comprises a dimple located in alignment with said fastener-receiving opening and projecting from said mounting plate toward said base plate.

18. The mounting member of claim 13 further including locating means for positioning said plates at a predetermined location on an engine.

19. The mounting member of claim 18 wherein said locating means comprises at least one shoulder formed in said mounting plate.

20. The mounting member of claim 13 further including rotation prevention means on said base plate engageable with an engine mounting bracket for preventing rotation thereof with respect to said bracket.

* * * * *